United States Patent [19]

Sanner

[11] Patent Number: 4,952,908

[45] Date of Patent: Aug. 28, 1990

[54] TRAILER STABILITY MONITOR

[75] Inventor: John A. Sanner, Fort Wayne, Ind.

[73] Assignee: Navistar International Transportation Corp.

[21] Appl. No.: 209,152

[22] Filed: Jun. 20, 1988

[51] Int. Cl.$^5$ ............................................. B60R 25/10
[52] U.S. Cl. .................................... 340/429; 340/431; 340/689
[58] Field of Search ............ 340/52 H, 689, 58, 425.5, 340/429, 431; 200/52 A, 61.52, 61.47, 187, 220, 221, 224; 280/6 R, 6 H, 6.1

[56] References Cited

U.S. PATENT DOCUMENTS

| 3,804,435 | 4/1974 | See et al. ........................ 280/150 AB |
| 4,296,485 | 10/1981 | Clemens ................................ 340/689 |
| 4,592,565 | 6/1986 | Eagle .................................... 280/432 |
| 4,658,508 | 4/1987 | Oberg ..................................... 340/689 |
| 4,737,759 | 4/1988 | Stropkay et al. .................. 340/52 H |
| 4,760,371 | 7/1988 | Don ......................................... 340/58 |

*Primary Examiner*—Joseph A. Orsino
*Assistant Examiner*—Frank M. Scutch, III
*Attorney, Agent, or Firm*—F. David AuBuchon; Dennis K. Sullivan

[57] ABSTRACT

A trailer stability monitor for tractor-trailer vehicles including a motion sensor and signal responsive r.f. transmitter responsive thereto mounted on the trailer and a r.f. signal receiver coupled to alarm means and mounted on the tractor, preferably in the cab thereof, for receiving the signal from said transmitter and causing an alarm to warn the operator of the tractor-trailer of conditions conducive to rollover to permit remedial measures to be undertaken to avoid such incident. The motion sensor includes a pair of angular mounted normally open mercury switches arranged to detect lateral forces to the right or left to a degree conducive to rollover. A vertically oriented normally closed mercury inertia switch is connected in series with the pair of angular mounted parallel connected switches to momentarily disable the circuit to prevent spurious signals from bumps. The switch array is connected in series with a battery and a lower power r.f. oscillator transmitter which transmits a coded low power signal when the switch array is closed. The receiver/alarm includes an r.f. receiver which can detect the signal from the transmitter and activate an alarm of sufficient power to alert the operator. The signal can be transmitted air to air via an antenna or by superimposing the signal on a pair of the existing electrical lines of the tractor-trailer, using the lines as an r.f. line carrier.

23 Claims, 2 Drawing Sheets

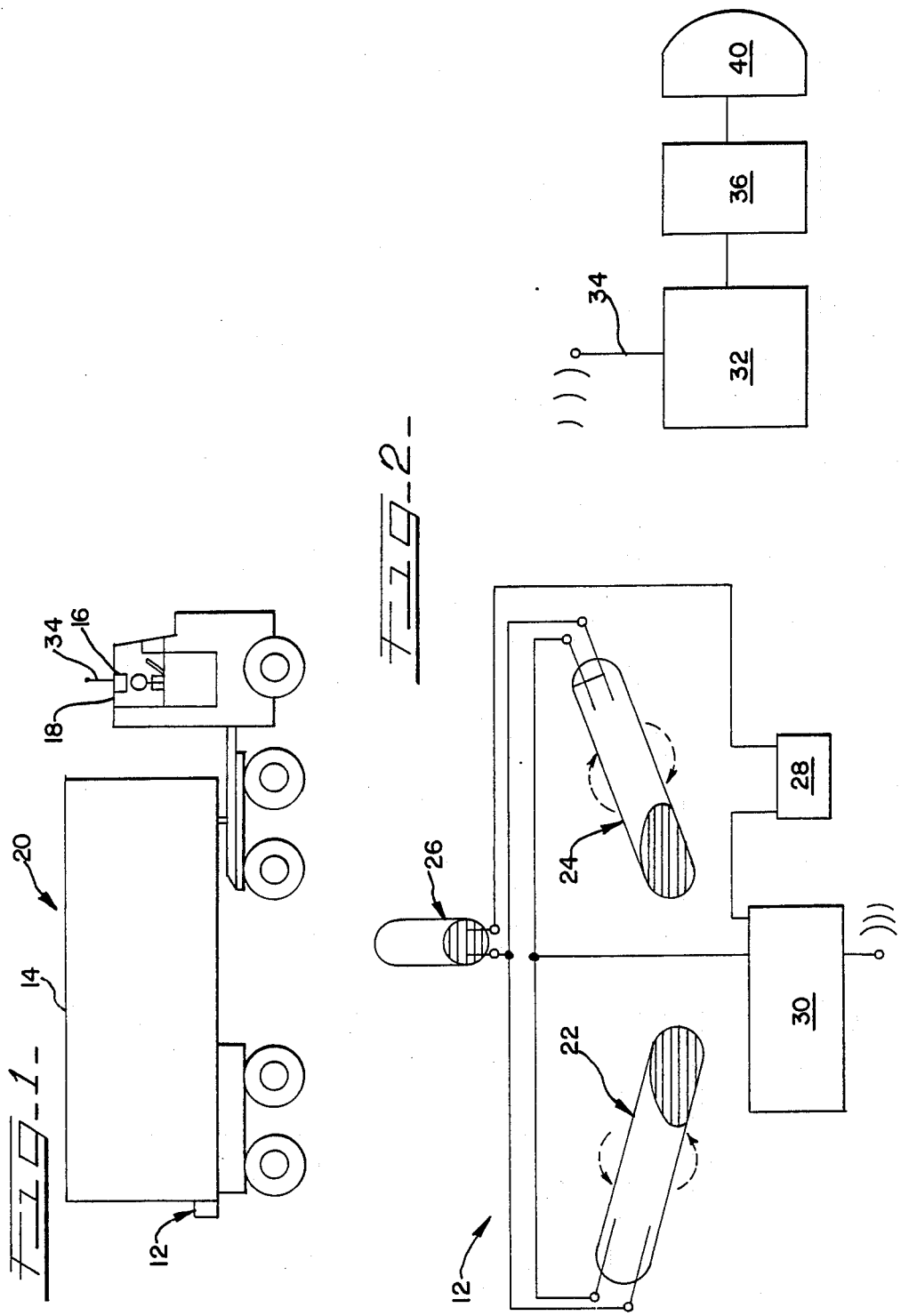

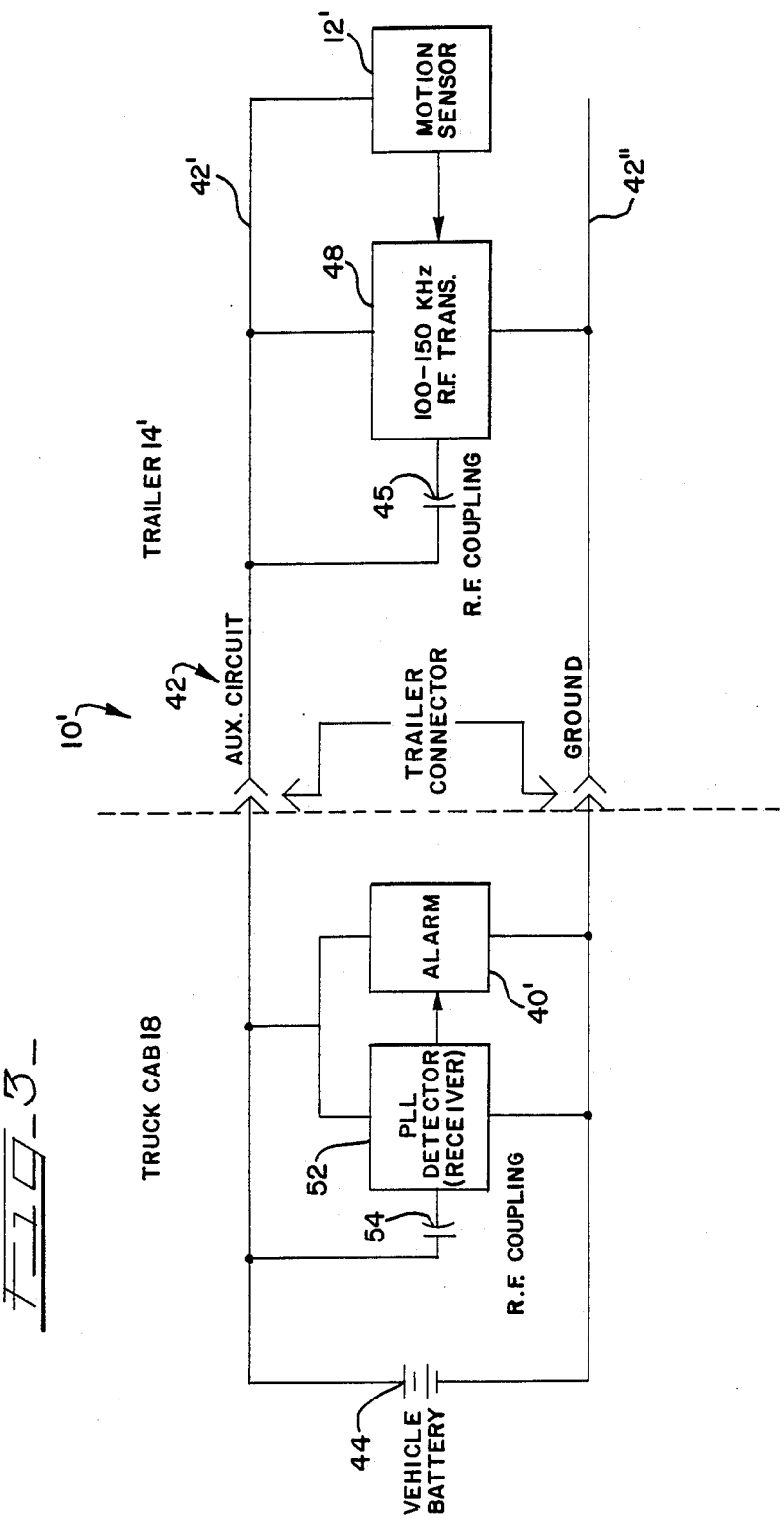

TRAILER STABILITY MONITOR

FIELD OF THE INVENTION

This invention relates generally to tractor-trailer vehicles and more particularly to a trailer stability monitor to alert the operator to the existence of conditions which, if unabated, may lead to a trailer rollover, hopefully in sufficient time to permit the operator to respond and avoid such incident.

BACKGROUND OF THE INVENTION:

One type of accident involving tractor-trailer vehicles is caused when the manner of vehicle operation and/or road conditions result in changes in the dynamics of the vehicle causing the trailer to tip up on one side. The trailer will generally roll over starting at the rear and continuing to the front until the whole rig, including the tractor, is on its side. While it is possible that the operator may sense the lateral force acting on the trailer, the operator may not be aware of an incipient rollover condition; and, if the forces which caused this condition continue unabated, the operator may not be able to avoid the rollover.

In many instances, the tilting action normally preceding an actual rollover is greatest at the rear of the trailer. The rear set of wheels on the trailer may even leave the road for a short time without the operator being cognizant thereof. If the operator were made aware of excessive lateral forces occurring at the rear of the trailer, there might still remain sufficient time within which the tilting action can be countermanded by the operator reducing speed, applying brakes, increasing the turning radius of the vehicle, or other actions appropriate to reducing the lateral forces and prevent the tractor-trailer from rolling over. Of course, the lateral force conditions may arise so quickly, due to the manner of operation of the vehicle or external factors, that the operator may be unable to react even if immediately alerted to such conditions.

Prior art approaches to alleviation of the problem of sensing an impending rollover condition generally provide sensor means coupled to means for effecting remedial actions. In See et al U.S. Pat. No. 3,804,435, means were provided for protecting an operator and reducing possible injury in the event of a rollover particularly of a bulldozer which is frequently operated on steep hillsides where lateral tipping and rollover may be a considerable danger. Operator restraint means were combined with means responsive to the tilt angle of the vehicle beyond a predetermined angle for actuating the operation of the air bag restraint means. The tiltsensor taught was a conventional single pole, single throw mercury switch which completes a circuit from a power source to the valve means when the vehicle attains a predetermined angle with respect to the vertical. The angle is set at a point whereat the vehicle center of gravity just exceeds the pivot point which varies with different vehicles.

The system suggested by See et al is not intended for use in sensing the impending rollover conditions, but rather is directed to protecting the operator upon the occurrence of rollover. The combination suggested by See et al is not adapted for installation on a tractor-trailer rig and does not contemplate the dynamic lateral forces arising from the highway operation of trucks. Additionally, a warning to the operator in advance of rollover was not contemplated by See et al.

The approach offered by Eagle U.S. Pat. No. 4,592,565 provides relatively complex apparatus for detecting an incipient overturning moment in a vehicle which comprises position-controlling servomechanism means, centrifugal force measuring means which includes a pressure-to-electrical signal transducer for generating a pressure indicating signal depending on a centrifugal force acting on the vehicle in a generally lateral direction, pressure indicating signal to error signal conversion means coupled to an output of said transducer means and providing an error signal at its output, the servomechanism means accepting and amplifying the error signal for transmitting a position-controlling force related to the error signal to means for avoiding the incipient overturning moment to prevent turning over of the vehicle. Further, the Eagle disclosure also contemplates providing road-curvature indicating means for measuring the curvature of the road travelled on by the vehicle, speed-indicating means for measuring the speed of the vehicle and means to combine the two measurements to provide a signal indicative of an incipient overturning moment. This signal is transmitted to control servomechanism means operating upon the brake pedal, the acceleration pedal, and/or the steering wheel to reduce the incipient overturning moment prevent such overturning.

SUMMARY OF THE INVENTION:

The trailer stability monitor provides an early warning of conditions conducive to a trailer rollover comprising lateral force sensor means mounted, preferably detachably, on the trailer, radio-frequency transmitter means coupled to said sensor means and sensitive thereto for transmitting a signal upon the occurrence of an event, radio-frequency receiver means spaced from said trailer for receiving said signal and alarm means coupled to said receiver means and capable of being activated by said signal, preferably the alarm means being auditory by nature. One embodiment employs through-the-air transmission of the signal produced when the motion detector switch is closed. A modified embodiment of the invention uses one pair of the electrical lines of the tractor-trailer rig as a r.f. line carrier for carrying the r.f. signal by superimposing the signal thereon. A time delay can be provided to avoid a warning set off by jostling of the lateral force sensor.

The invention further includes a unique lateral force or tilt sensor including a pair of parallel normally open mercury switches disposed at opposite acute angles to the horizontal to respectively sense the tilt angle of the trailer and/or the lateral forces acting on the trailer in either direction and a vertical normally closed mercury switch in series with the parallel switches wherein the vertical switch disables the warning circuit momentarily to prevent false signals if the trailer experiences sudden vertical movement as by the rig hitting a bump in the road which rapidly raises the trailer vertically momentarily, in contrast to the excessive lateral force or tilting motion of the trailer which indicates impending rollover.

BRIEF DESCRIPTION OF THE DRAWINGS

FIG. 1 represents a tractor-trailer vehicle having the trailer stability monitor of the invention operably installed thereon;

FIG. 2 is a block diagram of the stability monitor according to the invention; and FIG. 3 is an electrical circuit representation of a modified embodiment of the stability monitoring system according to the invention.

DESCRIPTION OF PREFERRED EMBODIMENTS

The trailer stability monitor described herein is intended to provide an early warning consisting of an audible alarm capable of alerting the operator of a tractor-trailer vehicle of the existence of conditions conducive to trailer rollover, the alarm being set off by a signal received from a sensor mounted on the trailer and capable of sensing angular tilt and/or lateral force sufficient to induce rollover of the trailer. It will be appreciated that if the tractor-trailer vehicle is parked on a soft shoulder or berm of a road that the trailer will have to tilt to set off the alarm. However, when the tractor and trailer are being operated on the highway, it is desirable for the alarm to be set off by lateral forces alone, without any necessity for the trailer to actually tilt.

Referring first to FIG. 1, the trailer stability monitor of the invention is represented as installed on a tractor-trailer vehicle 20. The trailer stability monitor generally designated comprises a sensor/transmitter unit 12 mounted on the trailer 14 at the rear thereof and a receiver/alarm unit 16 mounted in the cab 18 of the tractor-trailer vehicle 20. The sensor/transmitter is preferably detachably mounted as by magnets to the trailer frame on a transverse horizontal frame member above the suspension.

As represented in FIG. 2, the sensor/transmitter unit 12 comprises a motion sensor formed of a pair of normally open, mercury switches 22 and 24 each mounted at an acute angle, here 15°, relative the horizontal but in opposed directions. Switch 22 functions to sense tilt and/or lateral forces to the left while switch 24 functions to sense tilt and/or lateral forces to the right. The two switches 22 and 24 are connected in parallel and then connected in series with a third mercury switch 26 which is mounted vertically relative to switches 22 and 24 and is normally closed. Switch 26 functions to permit the sensor/transmitter unit 12 to be disabled by inversion of the unit. Switch 26 further functions as an inertia switch to momentarily break the circuit should one or the other of the switches 22, 24 be closed by sudden vertical movement as may be encountered by the trailer 14 hitting a large bump or hole in the road. The switches 22, 24 and 26 are connected to a lithium-battery 28 and then directly to a small, UHF digital oscillator module 30 which transmits a digitally coded low power signal by direct radiation off of the oscillator coil any time the circuit is completed by closing of one or the other of the switches 22 and 24 as a result of the tilt or the lateral forces acting on the trailer 14 reaching a level conducive to a rollover.

The receiver/alarm unit 16 is mounted on the cab 18 of the tractor-trailer 20 and contains a super regenerative digital receiver 32. The digital receiver 32 is powered from the vehicle electrical system (not shown) and is always energized. The signal from the sensor/transmitter unit 12 is received via a six-inch receiving antenna 34 mounted on the outside of the receiver/alarm unit 16. The receiver 32 processes and decodes the incoming signal and, after a one-tenth second delay via time delay means 36, activates a loud tone alarm 40. The alarm 40 continues to sound as long as the receiver 32 detects a sustained signal from the transmitter/sensor unit 12. When the operator hears the warning sound, he can perform the manual acts which he considers necessary to abate the rollover conducive conditions such as releasing the accelerator pedal, manipulating the steering wheel, and/or applying the brake until the warning alarm becomes silent, thus taking action to prevent the tractor-trailer vehicle 20 from overturning. It should be appreciated that the conditions causing rollover are dependent in many cases on the manner in which the tractor-trailer vehicle is operated and that in some cases these conditions may arise so quickly that the operator may not have sufficient time to react after he is alerted by the trailer stability monitor to avoid a rollover. Nevertheless, it is believed that the trailer stability monitor will provide a sufficiently early warning in most cases for the operator to prevent a rollover from occurring.

Referring to FIG. 3, a modified trailer stability monitor 10' is illustrated diagrammatically. A motion sensor 12', in the form of a lateral force sensor, is connected across line carrier circuit 42, the lateral force sensor 12' being mounted on the trailer 14' at the rear thereof. Conventionally, presently available tractor-trailer truck rigs employ an SAE standard 7-pin connector to carry electrical signals from the tractor to the trailer. Signalling from the trailer to the tractor generally has been thought not possible using such connector simply because there are no unused circuits. However, any one pair of these lines can comprise circuit 42. The circuit 42 includes the vehicle battery 44 as its power source. Mounted on the trailer 14' is a 100 to 150 KHZ r.f. oscillator/transmitter 48 connected across the circuit 42 and coupled in series with blocking capacitor 44 to define an r.f. coupling to said lines 42' and 42", line 42''' being coupled to ground. The motion sensor, in the form of lateral force sensor 12' substantially of the same construction as lateral force sensor 12, is coupled to the transmitter 48. Thus, when the lateral force sensor 12' is activated because lateral forces on the trailer become sufficiently extreme to be conducive to a rollover, the sensing circuit is closed and a low power signal is coupled onto the D.C. line 42'. A signal receiving mean, preferably a phase locked loop detector 52 is mounted in the cab 18 and is coupled through a capacitor 54 to the D.C. line 42'. When the detector 52 detects the signal emanating from the oscillator/transmitter 48, the output of said detector 52 is fed to an alarm 40' which may be either a visual alarm and/or an audible alarm so as to alert the operator of impending danger. The alarm tone and/or visual alarm display continues so long as there is a signal from the sensor/transmitter 12'

It is to be understood that the foregoing description is merely illustrative of preferred embodiments of the invention and that the scope of the invention is not to be limited thereto but is to be determined by the scope of the claims appended hereto.

I claim:

1. A trailer stability monitor for tractor-trailer vehicles comprising a lateral force sensor means mounted on the trailer, r.f. transmitter means coupled to said lateral force sensor means and responsible thereto for transmitting a signal when highway travel associated lateral forces acting on said trailer of a predetermined degree conducive to a rollover are sensed, r.f. receiver means mounted on said tractor for receiving said signal, means directing said signal to said r.f. receiver and alarm means mounted on said tractor and capable of being activated by said r.f. receiver, upon receipt of said signal thereby.

2. The trailer stability monitor as claimed in claim 1 in which said lateral force sensor means comprises a pair of normally open mercury switches arranged spaced one from the other and each disposed at a generally equal but opposite acute angle from the horizontal, one or the other of said switches adapted to close in the presence of lateral forces of a predetermined degree, said switches being connected in parallel and a third mercury switch oriented vertically relative to said pair of switches and in series therewith, said third switch being normally closed, said third switch capable of being inertially opened upon vertical translation thereof and at least momentarily disabling said transmitter.

3. The trailer stability monitor as claimed in claim 1 in which said alarm means comprises an audible alarm.

4. The trailer stability monitor as claimed in claim 3 in which said alarm means is activated continuously whenever the signal is present.

5. The trailer stability monitor as claimed in claim 1 in which there is an antenna supported on said tractor for receiving the signal from said transmitter and delivering said signal to said receiver means.

6. The trailer stability monitor as claimed in claim 1 in which said means for transmitting the signal from said transmitter to said receiver comprises an r.f. line carrier.

7. The trailer stability monitor as claimed in claim 1 in which said transmitter comprises an r.f. digital transmitter module.

8. The trailer stability monitor as claimed in claim 2 in which a lithium battery is coupled in series between said third switch and said transmitter.

9. The trailer stability monitor as claimed in claim 1 in which time delay means are interposed between the receiver and the alarm means.

10. A lateral force and tilt sensor comprising a lateral force and tilt sensing circuit formed by lateral force and tilt sensing switch means capable of being closed upon lateral force of a predetermined amount in one direction and a vertically oriented normally closed inertially activated switch, said vertical switch connected in series with said lateral force and tilt sensing switch means, and a source of power connected in series with said vertical switch to complete said lateral force sensing circuit, said vertical switch arranged to momentarily break said circuit upon sudden vertical displacement of said lateral force and tilt sensing switch means.

11. A lateral force sensor comprising a lateral force sensing circuit formed of a pair of parallel connected normally open mercury switches, each arranged mounted at an acute angle from horizontal and one of said pair capable of being closed upon lateral force of a predetermined amount in one direction and the other of said pair capable of being closed upon lateral force of a predetermined amount in the opposite direction, a third vertically oriented normally closed inertia switch, said third switch connected in series with said pair and a source of power connected in series with said third switch to complete said lateral force sensing circuit, said third switch arranged to momentarily break said circuit upon sudden vertical displacement of said pair of switches.

12. The lateral force sensor as claimed in claim 11 and, in combination therewith, signal generating means connected to said sensing circuit, said means being responsive to closing of one or the other of said pair of mercury switches to provide a signal, signal receiving means, means transmitting said signal to said signal receiving means and alarm means connected to said signal receiving means and responsive to said signal to effect an alarm upon receipt thereof.

13. The combination as claimed in claim 12 wherein said signal generating means comprise an r.f. transmitter, said signal receiving means comprise a receiving antenna and an r.f. receiver coupled therewith.

14. The combination as claimed in claim 13 and time delay means interposed between said receiver and said alarm means.

15. The combination as claimed in claim 13 in which said alarm means includes an audible alarm generator.

16. The combination as claimed in claim 13 in which said transmitter is an UHF, digital oscillator module including an oscillator coil capable of transmitting a coded low power signal by direct radiation off said oscillator coil.

17. The combination as claimed in claim 16 wherein said sensor and transmitter are mounted on the trailer of a tractor-trailer vehicle and said receiving means, receiver and alarm means are mounted on the tractor of said tractor-trailer vehicle whereby said generated alarm functions to warn the operator of said vehicle of impending trailer rollover.

18. The combination as claimed in claim 12 wherein said signal generating means comprise an r.f. transmitter coupled in series with a blocking capacitor to define an r.f. coupling to an electrical line pair of the tractor-trailer vehicle and said signal receiving means is coupled in series with a blocking capacitor to define an r.f. coupling to said electrical line pair.

19. In combination with a tractor-trailer vehicle, a trailer stability monitor comprising lateral force sensing means mounted on the trailer frame adjacent the rear end thereof for producing a signal indicative of highway travel associated lateral forces conducive to rollover, alarm means mounted on said tractor and responsive to said signal to provide an audible alarm tone for at least the duration of said signal, signal transmitter means mounted on the tractor and coupled to said sensor means and responsive thereto for transmitting said signal, signal receiver means mounted on the trailer and coupled to said alarm means, said signal transmitter means comprising an r.f. transmitter, said signal receiving means comprising an r.f. receiver and communicating means for carrying said signal between said transmitter and said receiver.

20. The trailer stability monitor as claimed in claim 19 wherein said communicating means comprise a receiving antenna coupled to said receiver means.

21. The trailer stability monitor as claimed in claim 19 in which said communicating means comprises an r.f. line carrier.

22. The trailer stability monitor as claimed in claim 19 in which there are time delay means between said receiver means and said alarm means.

23. The trailer stability monitor as claimed in claim 19 wherein said lateral force sensing means is detachably mounted on said trailer thereby facilitating use of said monitor in conjunction with other trailers.

* * * * *